UNITED STATES PATENT OFFICE.

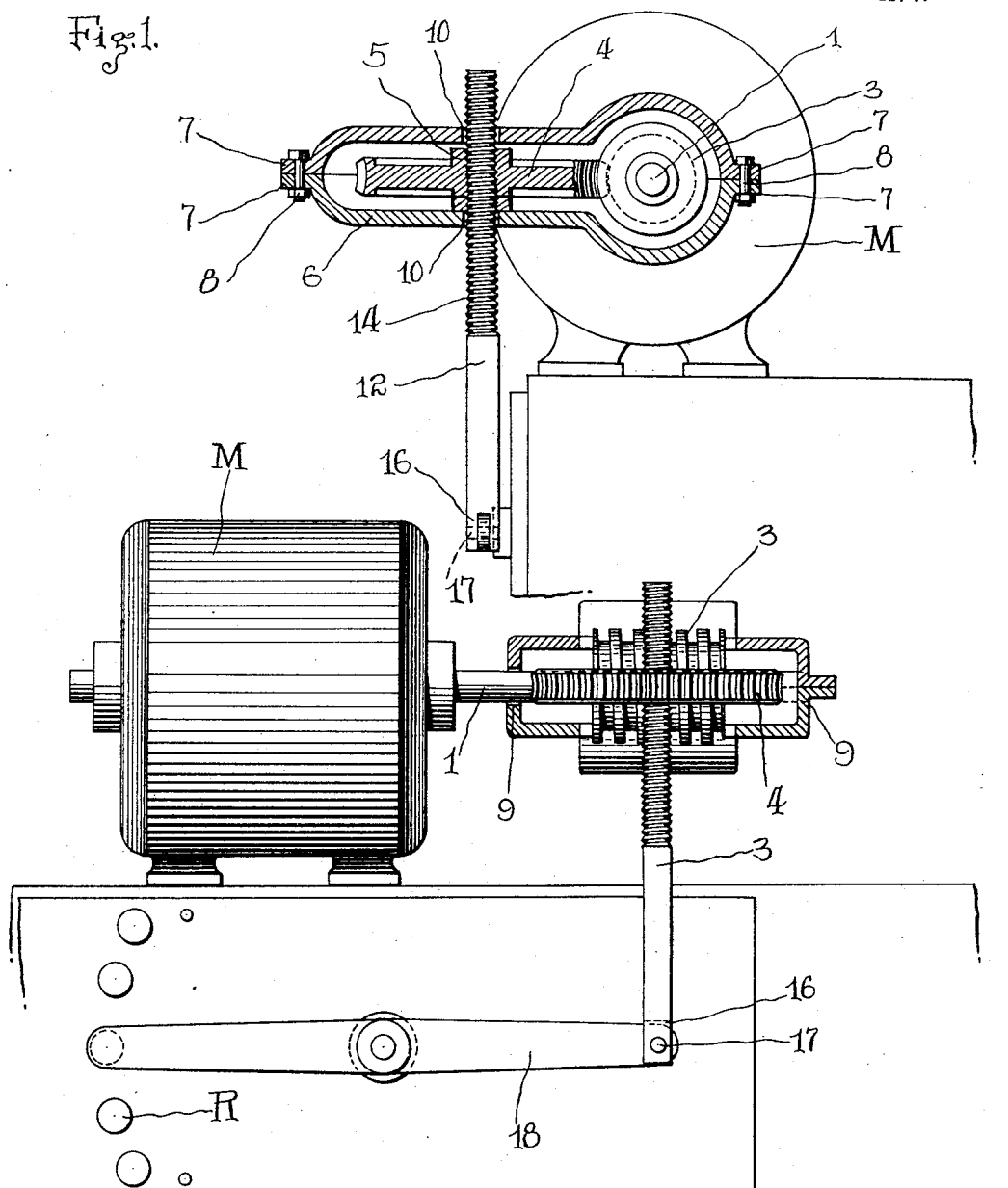

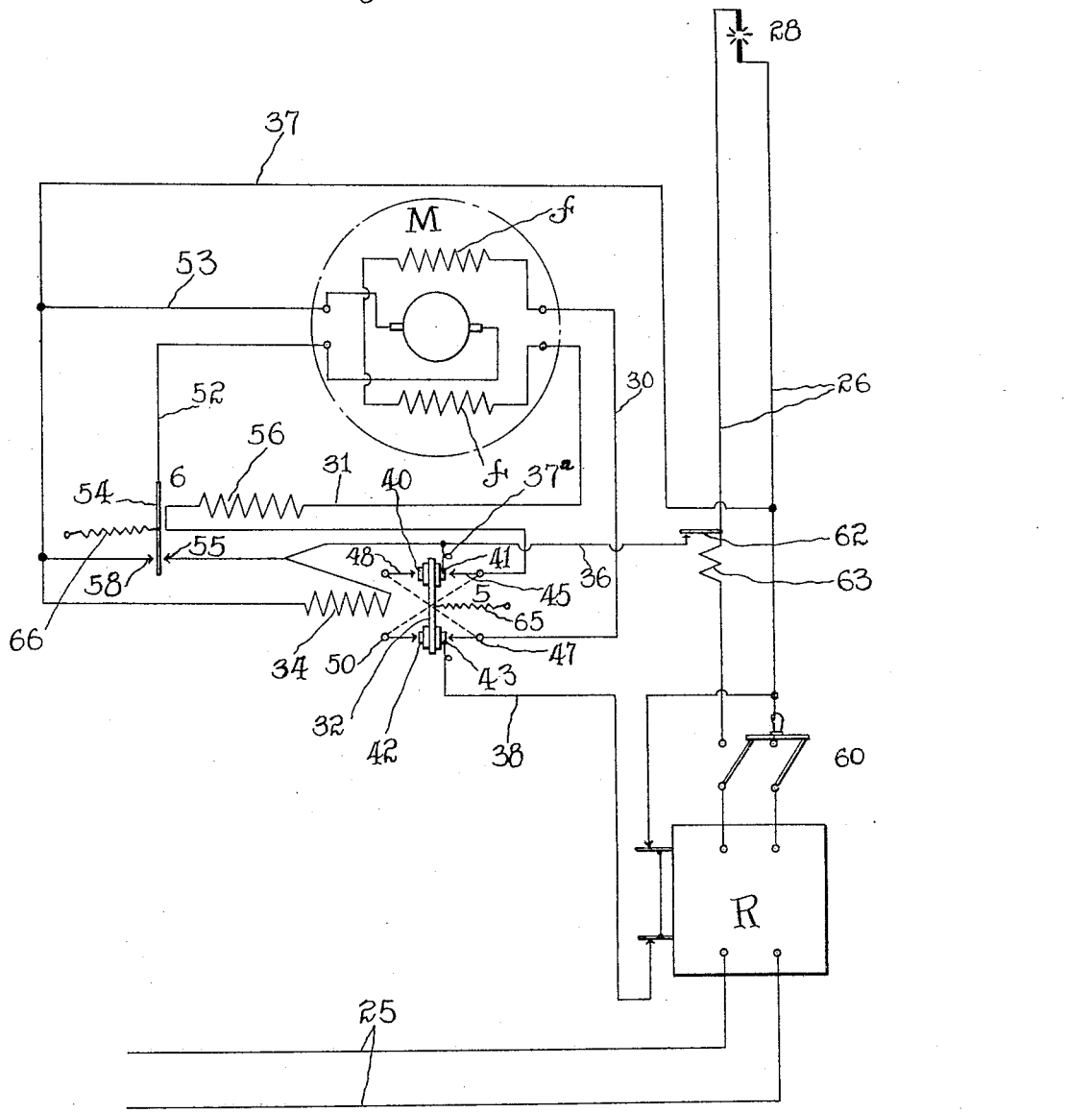

PLINY KILBURN WESTCOTT, OF NEW YORK, N. Y., ASSIGNOR TO SUN-LIGHT ARC CORPORATION, OF NEW YORK, N. Y.

AUTOMATICALLY-OPERATING MEANS FOR CONTROLLING RHEOSTATS OR EQUIVALENT DEVICES.

1,405,469.     Specification of Letters Patent.     Patented Feb. 7, 1922.

Application filed January 17, 1920. Serial No. 352,125.

*To all whom it may concern:*

Be it known that I, PLINY KILBURN WESTCOTT, a citizen of the United States, and resident of the city of New York, in the county of New York and State of New York, have invented certain new and useful Improvements in Automatically-Operating Means for Controlling Rheostats or Equivalent Devices, of which the following is a specification.

This invention relates to automatically operating means for controlling rheostats or equivalent devices and consists of an improved electrical controlling device and operating system therefor adapted automatically to operate a rheostat to regulate a circuit protected thereby so as to maintain a substantially constant voltage in the protected circuit. My improved protective device and system of control is particularly valuable for the protection and control of electric arc lamp or other load circuits from disturbance or fluctuation arising from changes in voltage of the main exciting circuit and also to compensate for variations in the resistance offered by the consuming devices so as to maintain a constant voltage drop therethrough.

Important features of my invention consist of a controlling motor and operating connections to the rheostat controlled thereby and in the arrangement whereby the controlling motor will be energized to rotate its armature in one direction or the other in response to change in voltage of the protected circuit and in a manner whereby the motor will operate the rheostat to regulate resistance thereof so as to compensate for increase or decrease in the voltage and thereby maintain a predetermined uniform or substantially constant voltage in the protected circuit.

The described and other features of my invention will be understood by reference to the accompanying drawings wherein like reference characters are applied to the corresponding parts in the several views.

Referring to the drawings:—

Fig. 1 is a view illustrating the controlling motor and improved operating connections therefrom to the rheostat, the latter being shown partially in vertical cross section.

Fig. 2 is a view of the arrangement disclosed in Fig. 1 illustrating the same in side elevation as viewed from the left of Fig. 1.

Fig. 3 is a diagrammatic view of my improved controlling system illustrating an approved manner of connecting up the respective circuits thereof.

In the preferred form of my invention I desirably employ as the mechanically operating and controlling means a suitable controlling motor M which is energized in the manner hereinafter described to rotate its armature forwardly or reversely as the conditions require. As best shown in Figs. 1 and 2 upon the usual armature shaft 1 of the motor there is affixed externally of the motor casing a driving worm 3. The threads of the worm 3 have operating engagement with the co-acting worm wheel 4 having an internally threaded hub portion 5. The worm and worm gear as shown are suitably enclosed within a two part casing and bearing member 6, the upper and lower half portions of which are formed with projecting securing flanges 7, 7 apertured to receive suitable clamping bolts 8, 8. The casing member 6 is suitably apertured at 9, 9 to receive and have bearing support upon the armature shaft 1 and is also provided with suitable openings 10, 10 in vertical alignment to permit passage therethrough of a rheostat operating rod 12.

As shown in Fig. 1 the worm gear 4 is positioned horizontally within the casing member 6 and the latter encloses the gear and also provides thrust bearings for said gear both above and below whereby the gear is positioned horizontally and held from vertical movement. The actuating rod 12 as indicated is threaded at 14 for a substantial distance of its length and its threads are fitted to engage and coact with the internal threads of the hub portion 5 of the worm gear whereby upon rotation of the worm gear 4 by means of the worm 3 it will transmit vertical movement to the actuating rod 12 in one direction or the other. At its lower extremity the rod 12 is provided with a forked end 16 connected by pivot pin 17 to the controlling arm 18 of a suitable rheostat R. As will be obvious from the described construction rotation of the motor armature will effect the movement of the rheostat controlling arm 18 to increase or decrease the resistance offered by the rheostat depending upon the direction of movement.

In accordance with further features of my invention the described simple and efficient motor operated connections for operatively controlling the rheostat are suitably connected and electrically energized to be responsive to fluctuations of voltage in a consuming or lamp circuit connected to the rheostat; the arrangement being such that the fluctuations in voltage will operate the controlling motor M in the direction required to actuate the rheostat so as to compensate for the change in voltage so as to maintain a substantially constant voltage in the protected lamp or load circuit. In the preferred embodiment for this purpose as shown diagrammatically in Fig. 3, 25 indicates the mains of a suitable energizing circuit from a generator or other source which is connected to the load or lamp circuit 26 through the protecting and regulating rheostat R. As will be readily understood one or more arc lamps 28 or other consuming devices are arranged in the load circuit 26 and it is desirable to protect the lamps or other devices from voltage fluctuations, to insure constant potential drop therethrough and to obtain uniformity in lighting or other action.

To operate the controlling motor M in the required manner whereby it will be operated in one direction or the other in response to voltage fluctuations of the circuit 26 it is arranged that the field exciting coils $f$, $f$ of the motor shall be energized by a circuit through conductors 30, 31 suitably connected to the positive and negative legs of the circuit 26 through a reversing relay switch 32 which is actuated in response to changes in voltage across the mains of the circuit 26. In accordance therewith as here shown the relay switch 32 is controlled by a magnet coil 34 arranged in series with the circuit through wires 36 and 37 suitably connected across the lines of protected circuit 26 so as to be responsive to fluctuations of voltage between the respective conductors of the circuit 26. The relay switch 32 is suitably connected by a connection 37$^a$ with conductor 36 and thus to the left hand side of circuit 26 and at its opposite side is connected by means of conductor 38 to the opposite or right hand side of the circuit 26. The relay switch as shown carries oppositely positioned and connected contacts 40, 41 at one side and at the opposite side similarly arranged connected contacts 42, 43. The contacts 41 and 43 as shown are directed to engage co-acting contacts 45 and 47 and the opposite contacts 40 and 42 are positioned to engage with contacts 48 and 50 when the carrier arm is shifted under the influence of the magnet 34.

As will be noted the contacts 45 and 50 and also the contacts 47 and 48 are connected in crossed relation as indicated in dotted lines whereby upon shifting of the relay switch 32 to the left or to the right will effect the reversal of the current flow through the magnetic field coils $f$ of the controlling motor and in consequence operate said motor in one direction or the other. This operation will be best understood upon noting that the leg 31 of the field coil exciting circuit is connected to contacts 41 and 50 adjacent to the opposite contacts of the movable switch member 32 and that the other leg 30 of the field circuit is similarly connected to both of the contacts 47 and 48 upon opposite sides and adjacent to the opposite contacts of the movable switch member. As the respective movable contacts 40, 41 and 42, 43 are insulated from each other and connected, the first to one side or leg of the protected circuit 26 through connection 37 and the other through connection 38 to the opposite leg, it will therefore follow upon movement of the relay switch member to the right, engaging contacts 45 and 47, that current will flow in one direction through the field magnets and upon shifting of said switch member to the left to engage contacts 48 and 50 the circuit will be closed and current caused to flow in the opposite direction.

For exciting the armature of the controlling motor a shunt circuit is provided through conductors 52 and 53 arranged to be connected to the opposite sides of the circuit 26. For the latter purpose conductor 52 is connected with a switch arm 54 adapted to engage a contact 55 connected to conductor 36 when said switch arm or armature 54 is attracted under the influence of magnet coil 56 in series with the field exciting circuit 31. At the opposite side of the armature 54 or contact maker a contact 58 is provided to be engaged by the armature 54 to short circuit the armature circuit when the fields are not energized. At 60 there is indicated a suitable circuit opening switch for the protected circuits 26 which it will be noted is arranged intermediate of the rheostat and the motor energizing conductors 37 and 38. A magnetically held protective switch 62 is arranged as indicated in series with the conductor 36 and having its armature contact arm held by a magnet coil 63 in series with the circuit 26 whereby upon breaking of the latter circuit the circuit 36 will be also opened so that the motor will not operate should the circuit 26 be broken at the arc.

The resulting operation for insuring constant and uniform voltage drop in the consuming devices such as the arc 28 will be readily understood from the foregoing. Upon closing of the circuit 26 by means of a switch 60 the coil 63 will be energized to close contact 62 and circuit through wire 36, coil 34 and conductor 37 to the opposite side of circuit 26. The shunt circuit thus established energizes the relay magnet 34 proportionate to the voltage across the arc thereby tending to attract the relay switch arm 32 or move it to the left against the oppositely exerted influence of a retractile spring 65 and it is arranged that when such voltage drop conforms to the desired voltage drop across the mains of the protected circuit 26 that the force exerted by the magnet 34 shall balance the opposed force of spring 65 whereby the relay switch arm will be held in the balanced or neutral position as indicated in Fig. 3 with its contacts in open position so that the controlling motor M will be de-energized. Assuming under these conditions that there is either a decrease or increase in the voltage across the mains 26 the balanced relation of the magnet 34 and spring 65, as will be readily understood, will be disturbed and the relay switch arm will be moved to the right or to the left so as to close the field exciting circuit through conductors 30, 31 to energize the motor to rotate in one direction or the other. Simultaneous with the closing of the field exciting circuit the contact maker 54 will be actuated by the coil 56 to engage contact 55 and thereby close the armature circuit 52, 53.

As will be readily understood the connection of the relay switch to the controlling motor and the mechanical connection from said motor to the controlling rheostat R is such that upon increase of voltage above the predetermined normal voltage desired, the motor will operate in a direction to move the actuating rod 12 to transmit motion to the rheostat controlling arm 18 in a direction to increase the resistance offered by the rheostat to compensate for the increase in voltage of the protected circuit and restore the voltage drop therein to normal. When so restored the relay switch will automatically open or break the field circuit of the controlling motor M and correspondingly the contact maker 54 will be opened by spring 66 to break the armature circuit 52, 53 and the motor will stop to bring the rheostat to rest. In similar manner upon decrease in voltage in the protected circuit the relay switch will close the motor field circuit with a current flow in the opposite direction whereby said motor is reversely operated to operate the rheostat, cut out resistance and automatically restore normal balance or voltage in the protected circuit.

My improved arrangement and system of control thus provides for automatically insuring the proper voltage drop through the consuming device or devices in a manner compensating for voltage disturbance resulting either from variations in voltage from the main exciting circuit or in the protected circuit 26, the means therefor being simple and efficient and particularly valuable in the protection of arc light circuits where uniformity in lighting effect is essential such as for instance in the taking of moving pictures.

While I have described an approved embodiment of the features of my invention it will be understood that various modifications may be made therein without departing from the scope of the invention as defined in the appended claim. It is therefore intended that all matter herein shall be interpreted as illustrative and not in a limiting sense.

I claim—

In a system of the character described, the combination of a rheostat and a circuit protected thereby, of a controlling motor and operating connections therefrom to the controller arm of the rheostat, means for energizing the motor in response to changes of voltage in the protected circuit operative to cause rotation of the motor armature in one direction or the other depending upon increase or decrease of voltage, said means comprising a field circuit for the motor, connections to the mains of the protected circuit and a reversing relay switch interposed between said connections and the field circuit and operative to close the latter to cause the current flow therethrough in one direction or the other, an actuating magnet for the relay switch, suitably connected across the mains of the protected circuit whereby said relay switch will be operated in response to change of voltage in the protected circuit, an armature circuit for energizing the motor armature, a contact maker operative to open and close the armature circuit, and an actuating magnet therefor arranged in series with the field circuit, substantially as described.

Signed at the city of New York, in the county of New York and State of New York, this 31st day of December, A. D. 1919.

PLINY KILBURN WESTCOTT.